US008838515B2

(12) United States Patent
Hansen et al.

(10) Patent No.: US 8,838,515 B2
(45) Date of Patent: Sep. 16, 2014

(54) METHOD FOR PREDICTING PIRATE ATTACK RISK IN A GEOGRAPHICAL AREA BASED ON INTEL REGARDING PIRATES AND PIRATE BEHAVIOR COUPLED WITH METOC CONDITIONS

(75) Inventors: James A. Hansen, Pebble Beach, CA (US); Daniel Hodyss, Marina, CA (US); Craig H. Bishop, Monterey, CA (US); William Campbell, Pacific Grove, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 411 days.

(21) Appl. No.: 13/272,272

(22) Filed: Oct. 13, 2011

(65) Prior Publication Data
US 2012/0095946 A1    Apr. 19, 2012

Related U.S. Application Data

(60) Provisional application No. 61/392,973, filed on Oct. 14, 2010.

(51) Int. Cl.
| G06F 17/10 | (2006.01) |
| G06F 17/30 | (2006.01) |
| G06F 19/26 | (2011.01) |
| G06F 19/24 | (2011.01) |
| G06Q 10/06 | (2012.01) |
| G06Q 50/28 | (2012.01) |
| G06Q 10/04 | (2012.01) |
| G01W 1/10 | (2006.01) |

(52) U.S. Cl.
CPC .............. *G01W 1/10* (2013.01); *G06Q 10/0635* (2013.01); *G06Q 50/28* (2013.01); *G06Q 10/047* (2013.01)
USPC .................................. 706/45; 706/16; 706/21

(58) Field of Classification Search
USPC .......................................................... 706/45
See application file for complete search history.

(56) References Cited

U.S. PATENT DOCUMENTS

| 2008/0077474 | A1 | 3/2008 | Dumas et al. |
| 2009/0100101 | A1 | 4/2009 | Marotta |
| 2010/0023364 | A1 | 1/2010 | Torvmark et al. |
| 2010/0131202 | A1 | 5/2010 | Dannevik et al. |
| 2010/0138644 | A1* | 6/2010 | Yannacone et al. ........... 713/150 |

OTHER PUBLICATIONS

Search Report and Written Opinion mailed May 4, 2012 in PCT Application PCT/US2011/056052.

* cited by examiner

*Primary Examiner* — Jeffrey A Gaffin
*Assistant Examiner* — Nathan Brown, Jr.
(74) *Attorney, Agent, or Firm* — US Naval Research Laboratory; Joslyn Barritt

(57) ABSTRACT

A method for predicting the risk of a pirate attack in a geographical area and for generating a distribution of probabilities of a pirate attack based on intelligence (INTEL) information regarding the pirates and pirate behavior combined with information regarding environmental and meteorological (METOC) conditions and information regarding shipping activity and shipping vulnerabilities. The method can also be used to predict the probability of other activities that are subject to METOC conditions, such as anti-narcotics efforts, undersea warfare operations, mine warfare operations, and human trafficking interdiction.

12 Claims, 5 Drawing Sheets

METHOD FOR PREDICTING PIRATE ATTACK RISK IN A GEOGRAPHICAL AREA BASED ON INTEL REGARDING PIRATES AND PIRATE BEHAVIOR COUPLED WITH METOC CONDITIONS

CROSS-REFERENCE

This application claims the benefit of priority based on U.S. Provisional Patent Application No. 61/392,973 filed on Oct. 14, 2010, the entirety of which is hereby incorporated by reference into the present application.

TECHNICAL FIELD

The present invention relates to a method for combining intelligence information, meteorological forecast information, and suspected adversarial behavior to predict the spatio-temporal distribution of adversaries and the associated risk of attack, particularly the distribution and risk of attack by sea-going pirates.

BACKGROUND

Global piracy activity is on the rise. The region around the Horn of Africa experienced a tenfold increase in piracy in 2009 and 2010 relative to 2008 despite increased effort by European Union (EU), NATO, and U.S. Naval forces.

It is estimated that piracy costs the U.S. maritime industry between $1 billion and $16 billion per year. The U.S. Department of Transportation Maritime Administration outlines several economic impacts associated with enhanced piracy activity around the Horn of Africa. These include the fuel and personnel costs associated with rerouting ships via the Cape of Good Hope, as well as the opportunity costs associated with increased transit times. For ships that choose to transit through high-risk areas, there are increased insurance costs for operating in an area with high piracy activity, costs of additional security, and costs of nonlethal deterrent equipment. In addition, there are national costs associated with increased naval activity to protect shipping in high-risk areas.

Commercial activities are not the only casualties of piracy. Piracy also threatens humanitarian aid efforts around the Horn of Africa. For example, the U.S.-flagged and crewed MV Maersk Alabama was en route to Somalia to deliver food aid when it was boarded by pirates. There is also concern that the money being paid in ransom for hijacked ships is being used to finance regional conflicts around the Horn of Africa and potentially to finance terrorist activities.

Agencies involved with piracy interdiction quickly realized that meteorological and oceanographic (METOC) conditions strongly modulate pirate activity. In 2009 the Oceanographer of the Navy tasked the Naval Oceanographic Office (NAVOCEANO) to develop a product that predicted and communicated the suitability of the environment for pirate operations in the Somali Basin. NAVOCEANO responded by developing the Piracy Performance Surface (PPS).

The PPS ingests operational ocean wave forecasts from the Wave Watch III model run at the Fleet Numerical Meteorology and Oceanography Center (FNMOC) and surface current forecasts from the Navy Coastal Ocean Model (NCOM) run at NAVOCEANO. The wave forecasts are modified by the surface current forecasts to produce wave steepness forecasts. These forecasts of wave steepness are indexed between 0 and 1 to represent the suitability of the conditions for pirate attack. This environmental suitability is blended with historical pirate attack information (90% environment, 10% attack) to produce the PPS product.

However, the PPS has many limitations.

First, although PPS predicts the suitability of conditions for a pirate attack, "suitability" is impossible to interpret or validate quantitatively. Only qualitative interpretation and validation is available (e.g. there are more attacks when the suitability is high). It does not provide any quantitative information regarding the probability of an attack that decision makers can use to assess the risk of attack and take suitable actions based on that risk.

In addition, the PPS is dominated by environmental information. However, environmentally suitable areas for pirate operations tend to be far too broad to be strategically useful (e.g. the entire Somali Basin is suitable for attack). PPS has a further disadvantage in that it does not include the entire set of environmental factors that may affect pirate behavior in its analysis. Because pirates tend to operate in small vessels, they are particularly vulnerable to adverse winds and seas. However, although PPS utilizes surface waves in its analysis, it does not utilize surface winds, and utilizes surface currents only insofar as they modify surface waves, but not from the point of view of how they impact pirate drift.

Moreover, PPS does not include intelligence information about where pirate activity is expected to be high. It only communicates environmental information that has been slightly modified by historical pirate attack information. PPS therefore does not provide focused information that can aid decision makers regarding where they should deploy their assets.

Thus, there is a need for an improved method that includes both intelligence and meteorological information in predicting the probability of a pirate attack in a particular geographical area.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computer-implemented method for predicting the risk of a pirate attack in a geographical area based on intelligence (INTEL) information regarding the pirates and pirate behavior coupled with information regarding environmental and meteorological (METOC) conditions.

In accordance with the present invention, a computer programmed with appropriate software can be input with INTEL data regarding pirates in the area of interest, such as the number and location of pirate groups; their associated bases and waypoints; whether they know about the weather; mission type and expected mission length for each pirate group; the structure of the base and waypoint distributions, land- or ship-based; expected skiff speed for each pirate group; the search pattern used by each pirate group (e.g. drift, correlated random walk, zig-zag, transit, or some combination); the departure time distribution for each pirate group; and the METOC thresholds for each pirate group.

After the INTEL parameters are input, METOC data is input into the computer. The METOC data includes the METOC thresholds for each pirate group, the available forecast lead times for this forecast period, and the fields of wind, wave, and current forecasts for the geographic area of interest.

The computer then generates a series of a model pirate trajectories, or "pirate replicates," each replicate having a specific set of INTEL and METOC attributes, such as departure time, base location, waypoint location, type of vessel, vessel speed, vessel METOC limits, mission type, and mission length. Each replicate is a member of a suite of Monte Carlo simulations.

Each replicate trajectory has three legs, reflecting pirate behavior: in Leg 1, the pirates transit from their base to a waypoint; in Leg 2, the pirates hunt for targets to attack; and in Leg 3 the pirates return to base. Such a three-leg construct enables a wide range of concepts of operations, or "CONOPS," e.g. transit only, hunt only, hunt then transit, etc. At each leg, the pirate behavior is affected by the METOC conditions.

The computer then compiles all the generated trajectories and calculates a probability distribution $p_p$ of pirate presence in a geographical area of interest for each of several different time periods.

The computer also receives data regarding shipping activity in the area of interest and constructs a probability field $p_s$ of vulnerable shipping activity in the area of interest and determines a probability $p_e$ that that the environment is suitable for a pirate attack to occur (e.g. allows for skiffs to travel at 25 knots).

The computer then multiplies the probabilities together to provide a prediction $p_a$ of the probability of attack, where $$p_a = p_p p_s p_e.$$

The pirate distributions and attack probabilities can be plotted for display in a manner that the high risk, high probability areas are immediately identifiable so that appropriate actions to avoid attack can be taken.

BRIEF DESCRIPTION OF THE DRAWINGS

FIG. 2A is a plot of an exemplary single pirate replicate trajectory and FIG. 2B is a plot of multiple pirate replicate trajectories generated by changing one or more INTEL or METOC parameter in accordance with the present invention.

DETAILED DESCRIPTION

Figure 1A:
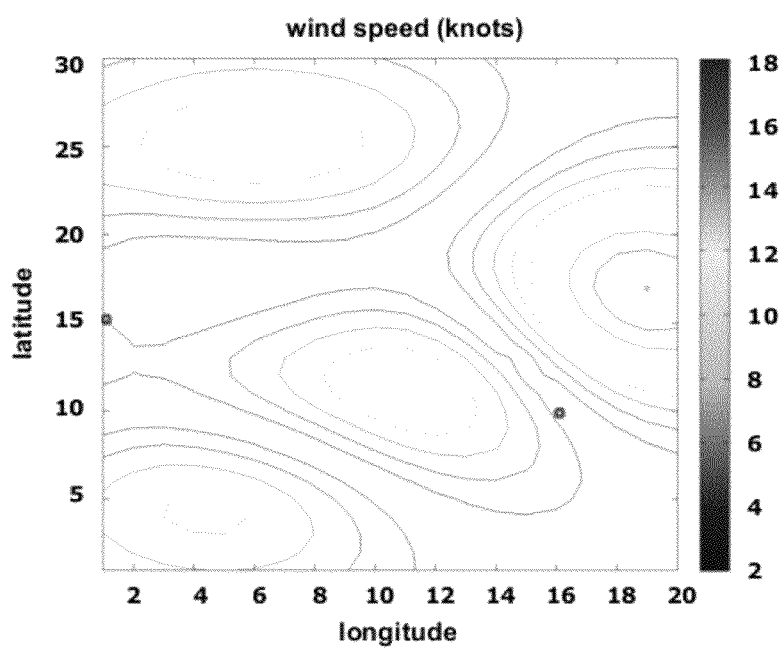
FIGS. 1A and 1B depict an idealized, exemplary wind field (FIG. 1A) and an exemplary current field (FIG. 1B) for a geographic area for which pirate replicates are generated in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the method for assessing risk using the combination of INTEL, METOC, and behavioral information in accordance with the present invention is described herein in the context the risk of pirate attack on shipping activity, one skilled in the art would readily appreciate that the risk of pirate attack is present for other maritime activities, such as Naval operations, cruise line traffic, and private boating, and the methodology described herein can be used to predict the risk of pirate attack on those activities as well. In addition, although the methodology of the present invention is described herein in the context of pirate activity and pirate attacks, one skilled in the art would understand that the methodology described herein can be used in many other areas where the activity may be affected by METOC conditions, such as anti-narcotics efforts, undersea warfare operations, mine warfare operations, and human trafficking interdiction.

As noted above, global pirate activity is on the rise, and the costs and risks associated with such pirate activity are of significant concern both to military and civilian operators of seagoing vessels.

An analysis by scientists at the Naval Research Laboratory of the meteorological and oceanographic (METOC) conditions associated with pirate attacks off the HOA indicates that such METOC conditions strongly modulate pirate activity.

The present invention utilizes this fact to provide an improved method of predicting the presence of pirate activity in a given area based on a combination of METOC information and intelligence data (INTEL) regarding pirates and their activity.

As will be appreciated by one skilled in the art, a method for assessing and predicting the risk of a pirate attack in accordance with the present invention can be accomplished by executing one or more sequences of instructions contained, in computer-readable program code read into a memory of one or more general or special-purpose computers configured to execute the instructions.

As described in more detail below, in the pirate risk assessment method in accordance with present invention, such a computer can be input with both INTEL data regarding pirates in the geographical area of interest and METOC data for that geographical area. Based on those inputs, the computer generates a series of a model pirate trajectories, or "pirate replicates," each replicate being a member of a suite of Monte Carlo simulations and having a specific set of INTEL and METOC attributes, such as departure time, base location, waypoint location, type of vessel, vessel speed, vessel METOC limits, mission type, and mission length. The computer can then generate a probability distribution of possible pirate activity in the area based on the set of trajectories. When the pirate probability distribution is combined with data regarding shipping activity in the area and the probability of attack-permitting environmental conditions, the computer can also generate a probability distribution of the risk of a pirate attack and can generate readily interpretable plots showing the distribution of that risk.

The programming code containing the computer-based instructions for the pirate prediction method in accordance with the present invention can be written in any appropriate program language, for example the PYTHON programming code developed by Python Software Foundation, and in a preferred embodiment is configured to run in parallel on multiple processors.

The code is driven by the contents of input files. These input files contain information such as:
- Model timestep;
- The number of pirate replicates generated by each Monte Carlo simulation for each pirate group;
- The number of pirate groups operating and the weight assigned to each group (reflects the confidence in the available INTEL information);
- Whether the pirate group has an observation associated with it (and therefore has a hard starting point in space and time);
- The location and type of base for the pirate group, e.g., a land base or a sea-based mother ship;
- The mean and variability of the length of pirate missions as a function of pirate group;
- Parameters that control hunting behavior such as correlated random walk a zig-zag patterns;
- The search pattern used by each pirate group;
- The mean and variability of the skiff speed associated with each pirate group as a function of whether they are transiting out, hunting, or transiting back to base;
- Nonparametric spatial distributions that describe the bases that each pirate group is departing from and returning to;
- Nonparametric spatial distributions that describe the waypoints that each pirate group transits to before hunting;
- Nonparametric temporal distributions that describe the time of day that each pirate group departs its base;
- Whether or not each pirate group has access to weather forecasts; and
- How each pirate skiff is impacted by the weather, i.e., by the resulting winds, waves, and currents.

The pirate risk assessment method in accordance with the present invention begins with the computer initializing a number of miscellaneous parameters, such as details about the parallelization desired by the user, the location of various input and output directories, and some of the input parameters described above, such as the integration timestep, the number of replicates, parameters associated with different hunting strategies (e.g. correlated random walk).

The computer then initializes the INTEL parameters used, such as the number of pirate groups, their associated bases, associated waypoint distributions, whether they know about the weather, the expected length of missions for each pirate group, the structure of the base distributions and the waypoint distributions, information about expected skiff speed for each pirate group, the search pattern used by each pirate group (e.g. drift, correlated random walk, zig-zag, transit, or some combination), the departure time distribution for each pirate group, and the METOC thresholds for each pirate group. This information can be derived from any suitable source, such as reports from the Office of Naval intelligence (ONI) and the NATO shipping center, debriefs from successful interdiction efforts, and numerous classified sources. Information is updated as it becomes available, with update timescales ranging from hours to months.

Figure 1B:
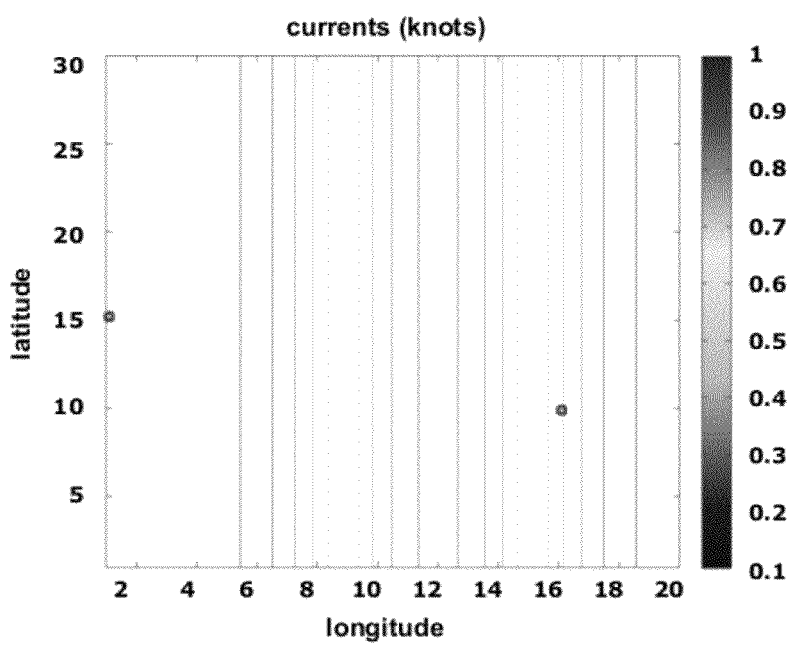

After the INTEL parameters are initialized, the environmental parameters to be used in the simulations are read in. These include the METOC thresholds for each pirate group, the available forecast lead times for this forecast period, and the fields of wind, wave, and current forecasts. METOC thresholds are a function of the type of vessels utilized by the different pirate groups, and reflect the vessel's ability to operate in different types of environmental conditions. For example, a small pirate skiff may have a set of METOC thresholds reflecting its inability to operate in strong currents or high winds, while a larger pirate ship may be able to withstand much stronger winds or higher seas before its operations are affected. When observations of individual pirate groups and their equipment are available. METOC threshold data can be provided by subject matter experts. When direct observations are not available, historical information regarding the vulnerability of pirate vessels can be utilized. Wind, wave, and current METOC forecasts can be provided by any suitable source such as the Navy Operational Global Atmospheric Prediction System (NOGAPS), version 3 of the Wave Watch model (WW3), and the Global Navy Coastal Ocean Model (GNCOM), respectively. Both deterministic and ensemble forecasts can be supported with any forecast frequency and lead. Currently, three-hour METOC forecasts extending out to 72 hours are utilized. The atmospheric and wave predictions can be updated every 6 hours. The ocean predictions can be updated every 24 hours. The METOC information can be reflected in plots of wind speed and current like those shown in FIGS. 1A and 1B.

Using this information, the computer generates a number of modeled pirate entities, or "pirate replicates" (sometimes referred to herein as simply "pirates"). Each pirate replicate is defined by a set of parameter values. These parameters include INTEL-based parameters such as the location of its base and waypoint, the type of skiff used, the pirate's departure time, the type of mission (e.g., transit vs. hunt), and the type of hunting behavior on the mission zig-zag vs. random walk). The parameters also include METOC-based parameters described above, such as the wind speed and wave height tolerances of the skiff. Each pirate also has a defined mission time length; the aim of pirates is to return to base, but once that mission time has expired, the pirate is considered to be "dead" and is removed from further consideration.

Once the pirate replicate is defined, the computer generates a trajectory for that replicate based on its defined attributes.

Figure 2A:
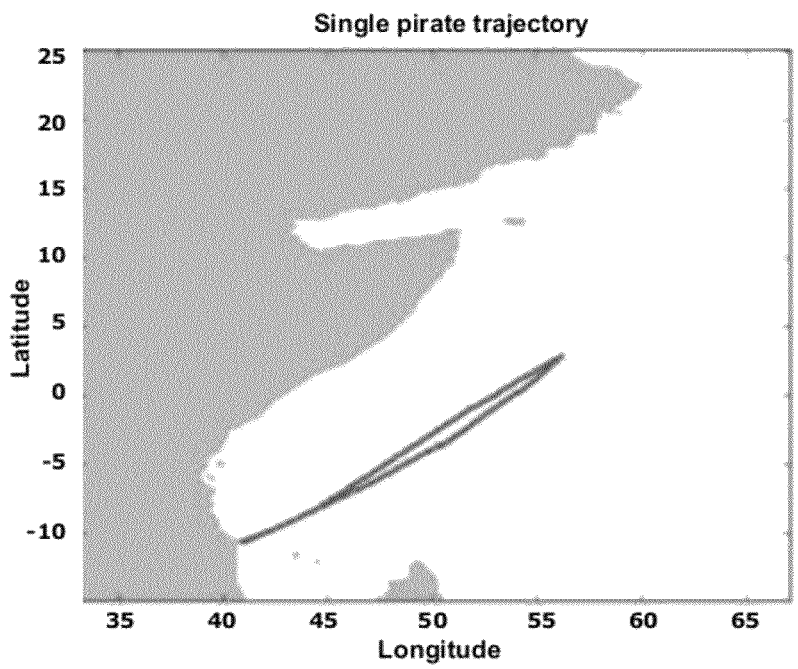
FIGS. 2A and 2B are exemplary pirate replicate trajectories generated in accordance with the present invention, where

A single pirate replicate trajectory modeled using combined INTEL and METOC parameters in accordance with the present invention is shown in FIG. 2A. In the trajectory shown in FIG. 2A, as described, in more detail below, the pirate leaves its base, transits at a set speed to a waypoint, hunts for commercial shipping, and then returns to base. Each of these activities is affected by the METOC conditions in a different way.

Thus, in accordance with the pirate risk assessment method of the present invention, the generation of the pirate trajectory is split into three legs.

In Leg 1, the pirate transits from its base location to its waypoint location at a speed specified in its input files. During this transit leg, the pirate is deemed to be impacted by winds and currents and a small random component. At every step along the trajectory for this leg, the METOC conditions at that point are interpolated from a regular grid. There is no interpolation in time; the METOC conditions are held constant between forecast times.

The probability that a pirate group has knowledge of the weather is an attribute that can be set in the input files if a pirate knows about the weather, it will choose a route that avoids exceeding its specified wind and seas thresholds (if one exists). If a pirate does not have weather forecast information and during the transit leg encounters winds or seas that exceed its specified METOC thresholds, it will take steps to avoid the adverse conditions. For example, the pirate may turn around and head all the way back to its departure base, or it may travel back towards its base only for a short time and then try heading towards its waypoint again. The pirate will continue with such avoidance behavior either until it reaches its waypoint or until its defined mission length is expired. If no adverse conditions are encountered, the pirate will continue towards its waypoint until it gets within some specified distance of the waypoint (given in the input files) or until its defined mission length has expired.

Leg 2 starts with the pirate at its waypoint and consists of the hunting leg of the pirate mission. Thus, once at its waypoint, the pirate will begin hunting. The hunting strategy for each pirate replicate (drift, correlated random walk, zig-zag) is set in the input files as a parameter of that replicate. As in Leg 1, depending on the attribute values assigned thereto, the pirate replicate's behavior in Leg 2 may be affected by the METOC conditions it encounters. For example, the skiff is pushed around by winds and currents while it is hunting, and so the hunting behavior of a given pirate group may vary depending on the type of skiff defined for that replicate and its METOC vulnerabilities. In addition, as with Leg 1, if the pirate encounters bad METOC conditions while hunting, depending on how vulnerable to had METOC the replicate is, it may continue hunting, may take a step towards its home base before resuming hunting, or may abandon the hunt and return to its home base.

Finally, in Leg 3, the pirate returns to its base. During the return phase the skiff ignores METOC thresholds, but skiffs are still pushed around by winds and currents, which may affect where in space the skiff is at any given time or how long it takes to transit the distance between its waypoint and its home base.

Any one or more of these legs can be modeled using the combined INTEL and METOC methodology in accordance with the present invention, i.e., transit only (Leg 1 only), transit and hunt (Legs 1 and 2), and hunt and return (Legs 2 and 3), and hunt Only (Leg 2 only).

Figure 2B:
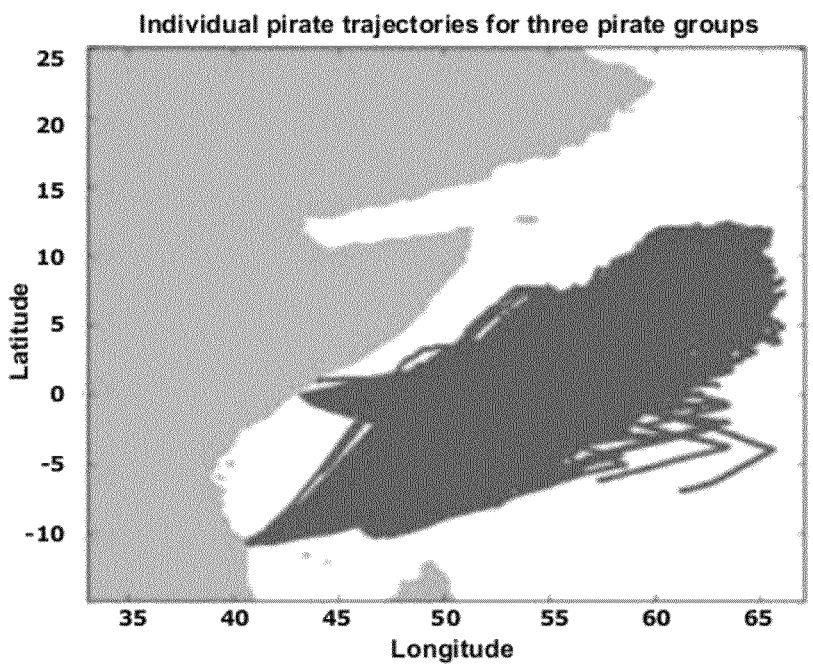

Multiple pirate trajectories are generated by changing the values of one or more of the replicate's parameters in a series of nested loops. FIG. 2B shows the result of many thousands of pirate replicate trajectories generated in accordance with the present invention based on different values of attributes such as base location, skiff speed, environmental impact limits, hunting areas, hunting tactics, etc.

The compilation of pirate replicate tracks generated as described above comprises a database of possible pirate locations as a function of time. Once such a database of pirate locations has been created, those possible locations can be interpreted probabilistically to obtain a geographic distribution of the probability of the presence of an active pirate at various time periods over a specified forecast window, e.g., various 12-hour time periods over 72 hours. The pirate probability distribution is generated by parsing the pirate database by different time periods, specifying a spatial grid, counting the number of pirates in each grid cell for each pirate group, and accounting for each group's relative weighting. The probability of one or more active pirates in a gridbox is computed by utilizing the addition rule of probability. The time periods and grid are customizable, so that probability distributions can be generated for shorter or longer time periods and for different geographic areas.

Figure 3A:
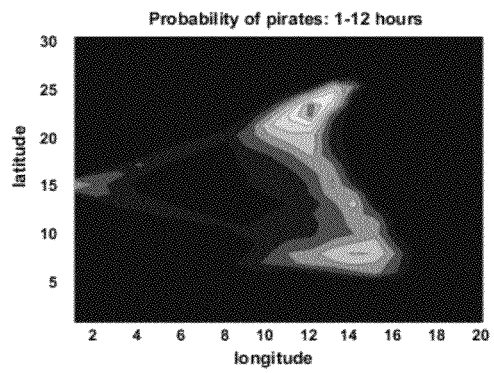
FIGS. 3A-3F are plots of exemplary pirate probability distributions generated in accordance with the present invention for six successive 12-hour time periods.
Figure 3B:
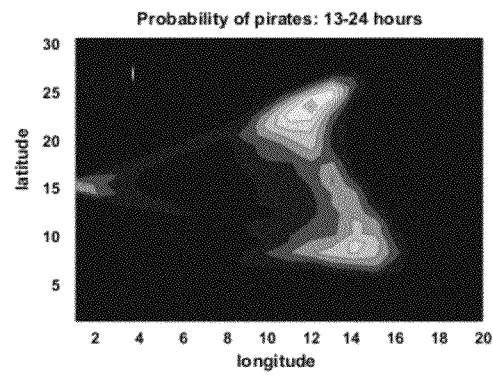
Figure 3C:
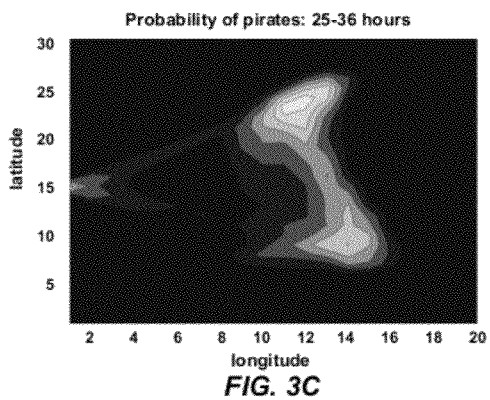
Figure 3D:
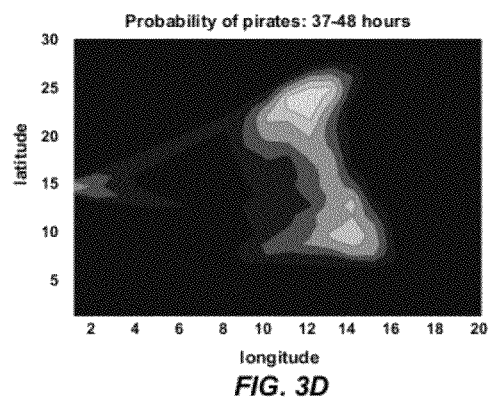
Figure 3E:
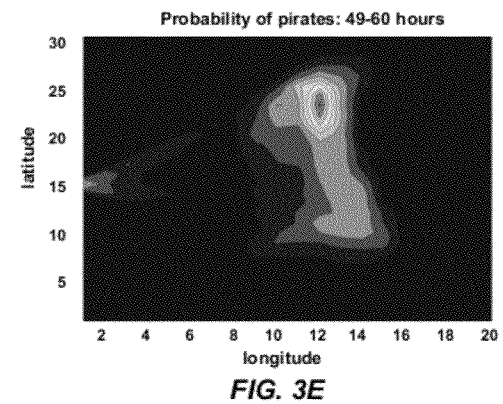
Figure 3F:
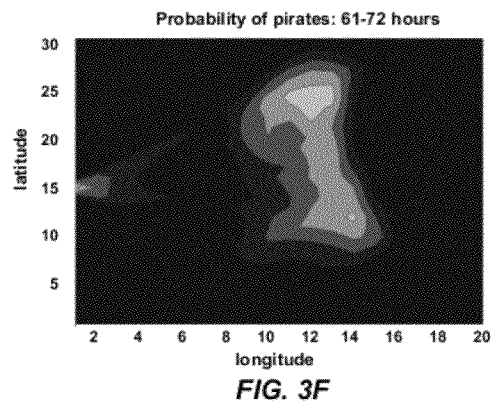
Figure 4A:
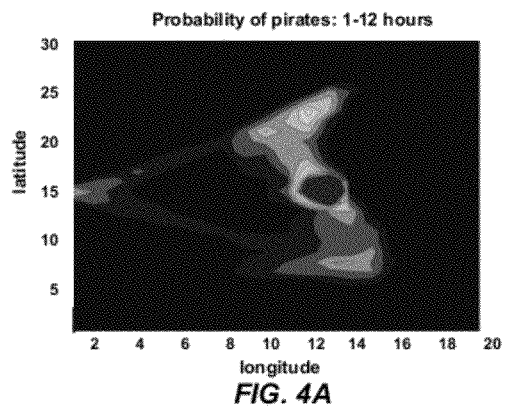
FIGS. 4A-4F are the exemplary pirate probability plots shown in FIGS. 3A-3F that have been statistically updated to reflect the impact of a pirate observation that has become available since the distributions were created but before a set of new pirate trajectories have been generated.
Figure 4B:
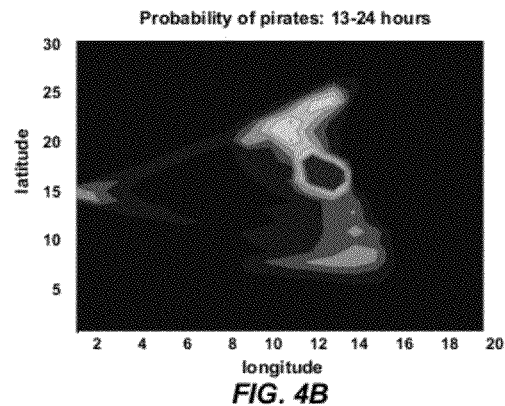
Figure 4C:
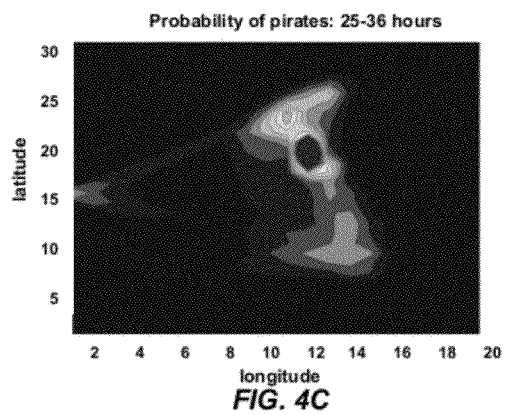
Figure 4D:
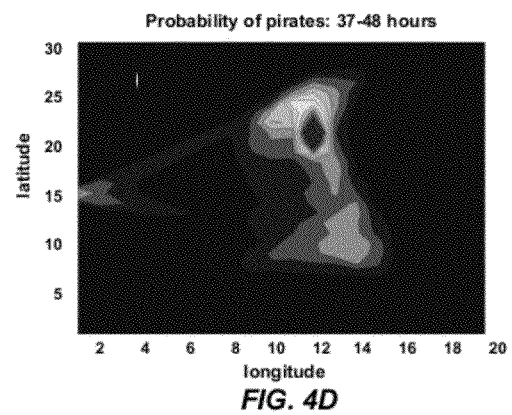
Figure 4E:
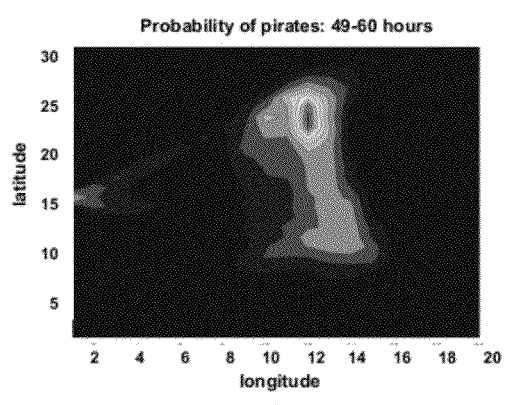
Figure 4F:
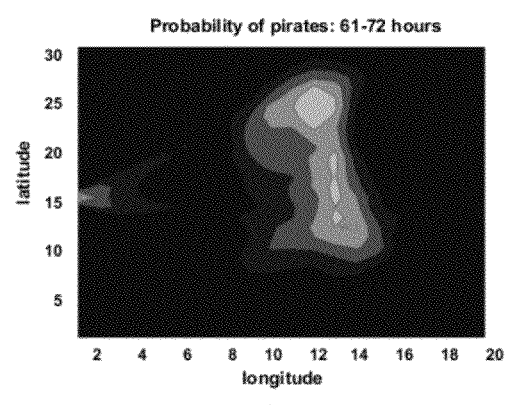

Exemplary probability distributions generated in accordance with this aspect of the method of the present invention are illustrated in the plots shown in FIGS. 3A-3F, where each plot shows the pirate probability distributions for successive 12-hour segments of the forecast period. Thus, FIG. 3A shows the pirate probability distribution for the first 12 hours, FIG. 3B shows the distribution for the second 12 hours, etc., with FIG. 3F showing the distribution for the time period between 60 and 72 hours. In each of FIGS. 3A-3F, the base distributions, waypoint distributions, number of pirates, etc.

are all held constant, with the only variable over the 72-hour period being the METOC forecasts; if there were no METOC data or no change in METOC conditions, the distribution would consist of a rectangular region in the middle of the domain describing the waypoint distribution. The fact that the pirate probability distributions at the various time periods look different from a rectangle is the result of the impact of the time-varying winds, waves, and currents.

If actual pirate observations become available in the period after the forecast has been run but before the next forecast is run, the entire spatio-temporal pirate distribution can be updated without re-running the model by taking a particle filter-like approach. To do so, the computer can search through the pirate database for tracks that are close to the observed location at the observed time and can plot a revised probability distribution from only those tracks using the INTEL data from the actual pirate observation.

Such an update is shown in the probability distribution plots shown in FIGS. 4A-4F, which reflect an update of the distribution plots shown in FIGS. 3A-3F based on a pirate observation at longitude 13E, latitude 15N. As can be seen from the distribution plot shown in FIG. 4A, during the first 12 hours, the pirate probability is extremely high in the vicinity of the observation, as would be expected. However, as can be seen from the plots shown in FIGS. 4A-4F, that concentration of pirate probability advects and diffuses over time due to the impact of pirate motion and the environment, and by 72 hours, the probability change due to the observation has essentially disappeared, with the pirate probability distribution 72 hours after the actual pirate observation shown in FIG. 4F being almost the same as the probability distribution for that time period without any actual pirate observations (FIG. 3F).

Although pirate distributions are useful, they are not the only information that may be of interest. Interdiction forces may not care about pirates being in a particular location if there is no shipping in that area; more relevant to them is a prediction of the probability of a pirate attack.

Three conditions must be met in order for a pirate attack to occur; there must be a pirate in the area, there must be a vulnerable ship in the area, and there must be METOC conditions that allow for an attack to take place. Consequently, in accordance with the method of the present invention, data regarding shipping activity in the geographic area of interest can also be input into the computer. Such data can come from any appropriate source, such as the Office of Naval Intelligence, commercial freight lines, and national and international commerce agencies. In some embodiments, the shipping data can treat all commercial shipping equally, while in other embodiments, it may be possible to compute the pirate attack risk individually for every ship in the domain. This would enable the system to account for parameters unique to each ship, such as its speed, freeboard, cargo, and flag.

Based on this input, the computer can generate a probability distribution of vulnerable shipping activity in the geographical area. In some embodiments, the distribution can be based on INTEL data of actual reported ship locations, while in other embodiments, the distribution can be based on predicted ship locations.

The METOC constraints that impact the transit and hunting behavior of a pirate are different from the METOC constraints that impact its ability to launch an attack. For example, while a skiff may be capable of transiting in high seas, it may not be able to stage an attack in those same seas due to the need maintain high speeds to close with the commercial ship and maintain stability while attempting to board the commercial ship. In accordance with the present invention, an analysis of the METOC conditions associated with historical pirate attacks has been made to provide an empirical distribution function, referred to herein as a "METOC distribution," that relates meteorological conditions to the probability that a pirate is able to launch an attack. This information can be used along with the probability distributions and shipping distributions to provide a probability distribution of a pirate attack.

Thus, in accordance with the present invention, the probability of a pirate attack can be estimated by multiplying the pirate distribution, the shipping distribution, and the METOC distribution described above, i.e., $$p_a = p_p p_s p_e$$

where $p_a$ is the probability of an attack, $p_p$ is the probability of a pirate being present, $p_s$ is the probability of vulnerable shipping being present, and $p_e$ is the probability of environmental conditions suitable to permit an attack being present.

In addition, it is highly possible that the available INTEL information is not complete. For example, there may be pirate bases that are unknown or pirate behaviors that have not yet been observed or there may be shipping activity that is not accounted for in the INTEL information. Consequently, it is possible that the pirate probability $p_p$ and/or the shipping probability $p_s$ used to estimate the risk of attack as described above have some associated error. To account for this, a "model error" term can be added to $p_p$ and $p_s$ to take such errors into account. An exemplary error term would modify $p_p$ and $p_s$ as follows:

$$p_p = \alpha p_{p,raw} + (1-\alpha) p_{p,climo},$$

$$p_s = \beta p_{s,raw} + (1-\beta) p_{s,climo}$$

here $\alpha$ and $\beta$ take on values between 0 and 1, $p_{p,raw}$ is the pirate probability produced as described above, $p_{p,climo}$ is a climatological pirate probability, $p_{s,raw}$ is the shipping probability produced as described above, and $p_{s,climo}$ is a climatological shipping probability. The climatological distributions $p_{p,climo}$ and $p_{s,climo}$ are constructed based on historical attack and shipping events. Of course, this error correction term is only exemplary, and other error correction terms may be used as appropriate under the circumstances.

Figure 5A:
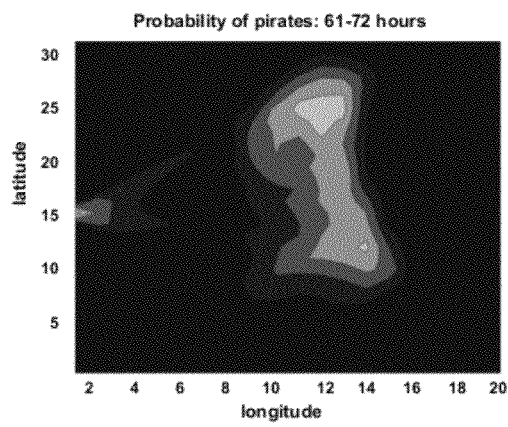
FIGS. 5A-5D are exemplary plots relating to the risk of a pirate attack generated in accordance with the present invention, with FIG. 5A showing the probability of pirate activity in a specified geographical area, FIG. 5B showing the probability of vulnerable shipping activity in the area, FIG. 5C showing the probability of a pirate attack based on the probabilities shown in FIGS. 5A and 5B, and FIG. 5D showing the risk of a pirate attack in the area.
Figure 5B:
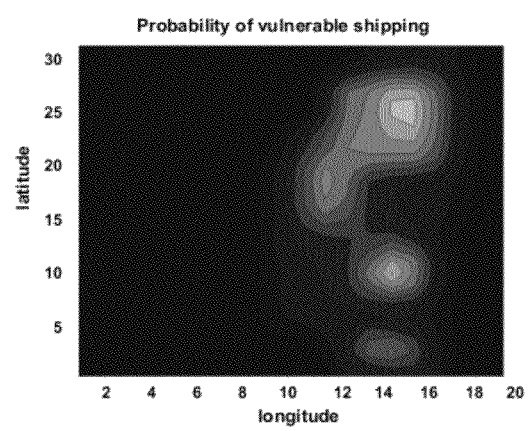

Once the probability of a pirate attack has been estimated as described above, the computer can generate a plot of the attack probability distribution so that the risk can be readily seen and interpreted. Exemplary plots of pirate attack probability are shown in FIGS. 5A-5D, FIG. 5A is a plot of the pirate probability distribution $p_p$ during a 12-hour period for the geographical area of interest, while the plot in FIG. 5B shows the probability distribution $p_s$ of vulnerable shipping activity in that geographical area for the same 12-hour period. It should be noted that in this example, the environmental probability distribution $p_e$ is a constant, i.e., the METOC conditions are considered to be suitable for attack in all locations.

Figure 5C:
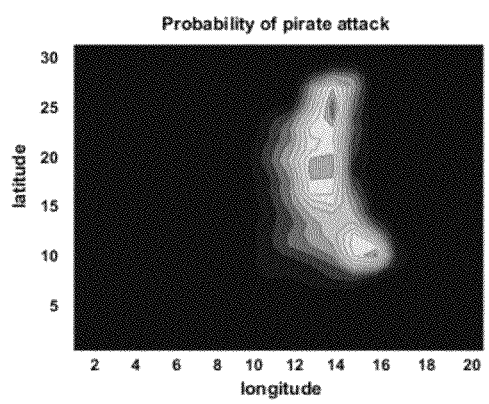

Multiplying the pirate, shipping, and environmental probabilities $p_p$, $p_s$, and $p_e$ as described above gives the probability of pirate attack $p_a$, which can be plotted as the exemplary probability distribution shown in FIG. 5C. Such a plot identifies the locations in space and time where pirate attacks are most likely to occur. The information can be used by interdiction agents to decide how to allocate surveillance and interdiction assets, or by commercial shipping to plan transits that avoid areas where pirates attacks are likely.

Figure 5D:
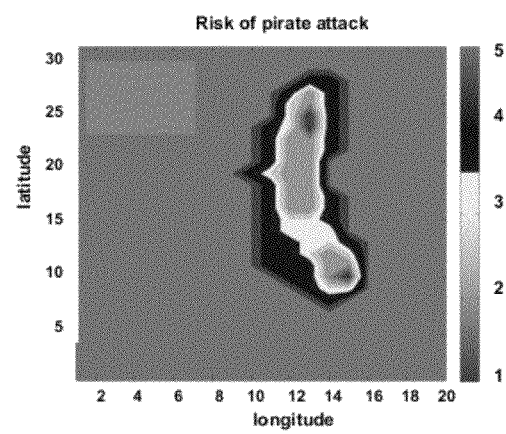

In some cases, such as where decisions must be made quickly or under difficult circumstances, it may be advantageous to provide an indication of the risk of pirate attack rather than simply an indication of the probability. Consequently, in accordance with the present invention, the probabilities of a pirate attack determined as described above can also be transformed to a risk space to better communicate the implications of a low probability, high impact event. The details of the transformation can be ascertained, through feedback from interdiction operators. For example, a simple linear color bar would attribute red colors to the top 30% of the probability areas. This may be inadequate to the needs of interdiction agents and so a transformation that renders the top 50% of attack probability to be red may be more valuable. An exemplary plot of such a risk distribution is shown in FIG. 5D. Thus, as can be seen in FIG. 5D, the risk of a pirate attack is most concentrated in the area in which the probability of vulnerable shipping (FIG. 5B) and probability of pirate activity (FIG. 5A) is highest, and drops off quickly away from those areas.

Advantages and New Features

The risk assessment method in accordance with the present invention the first that dynamically combines METOC, INTEL, and pirate behavior information to predict whether a pirate attack is likely to occur. Such an approach to fuse METOC and INTEL information using behavioral models has never previously been undertaken.

Rather than predicting an environmental suitability that must be interpreted by interdiction forces, the risk assessment method in accordance with the present invention predicts and communicates exactly what interdiction forces are interested in: the risk of a pirate attack.

In addition, because it includes INTEL and shipping information, the risk assessment method in accordance with the present invention identifies areas of pirate attack risk on a much smaller geographic scale than the geographic areas of high pirate attack suitability provided by the prior PPS method. Such smaller areas provide more value to interdiction forces, enabling them to better decide how to allocate their limited resources. Also, because it generates probabilities, the product is amenable to a wide range of objective approaches to verification, allowing the quantitative quality of the product to be communicated and providing a rigorous means of systematically improving the product.

The method of the present invention also enables the use of sensitivity studies to identify the input parameters that have the largest impact on pirate attack probabilities. Once those parameters are identified, INTEL effort can be expended to ensure that those sources of information are as accurate as possible. Similarly, intelligence analysts may be able to back out likely pirate concepts of operation (CONOPS) based on pirate observations, with such improved INTEL data being used in the next round of risk assessment. For example, it is possible to identify the pirate base most likely responsible for an attack, the most likely hunting strategy being utilized by pirate groups, etc. The method of the present invention also enables decisionmakers to pose and solve optimization problems and thus identify the optimal distribution of piracy interdiction forces.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. A computer-implemented method for predicting a probability of future pirate activity in a geographical area of interest, comprising:
   receiving, at a computer programmed with appropriate software, INTEL data representative of intelligence information relating to at least one pirate group in the geographical area of interest, the INTEL data including data of at least one of a meteorological and a climatological threshold associated with the pirate group;
   receiving, at the computer, METOC data representative of meteorological and climatological information associated with the geographical area of interest;
   generating, at the computer, data of a plurality of model pirate trajectories for the pirate group, each trajectory having a specific associated set of INTEL and METOC attributes for the pirate group;
   compiling, at the computer, the data of the model pirate trajectories; and
   calculating a probability distribution of a presence of the pirate group in the geographical area of interest for at least one future time period based on the compiled model pirate trajectories.

2. The method according to claim 1, wherein the meteorological and climatological threshold associated with the pirate group includes at least one of a wave, wind, and current threshold for the pirate group and the METOC data includes at least one of wave data, wind data, and current data in the geographical area of interest;
   wherein the probability distribution is based on at least one of a wave, wind, and current affecting the pirate group in the geographical area of interest.

3. The method according to claim 1, further comprising:
   receiving, at the computer, data of an actual pirate observation in the geographical area of interest; and
   generating a new probability distribution of future pirate activity based on a prior probability distribution and the actual pirate observation.

4. A computer-implemented method for predicting a probability of a future activity affected by meterological conditions in a geographical area of interest, comprising:
   receiving, at a computer programmed with appropriate software, INTEL data representative of intelligence information relating to at least one participant in the activity affected by meterological conditions, the INTEL data including data of at least one of a meteorological and a climatological threshold associated with the participant;
   receiving, at the computer, METOC data representative of meteorological and climatological information associated with the geographical area of interest;
   generating, at the computer, data of a plurality of model participant trajectories for the participant, each trajectory having a specific associated set of INTEL and METOC attributes for the participant;
   compiling, at the computer, the data of the model participant trajectories;
   generating, at the computer, a probability distribution of the participant's presence in the geographical area of interest for at least one future time period based on the compiled model participant trajectories;
   generating, at the computer, a probability distribution of a presence of meteorological conditions suitable for the participant to engage in the activity for the at least one future time period; and
   generating, at the computer, a probability distribution of an occurrence of the activity in the at least one future time period based on the probability distribution of the participant's presence and the probability distribution of suitable meteorological conditions in the geographical area of interest.

5. The method according to claim 4, further comprising generating, at the computer, a risk distribution indicative of the risk of the activity occurring in the geographical area.

6. The method according to claim 4, further comprising:
   receiving, at the computer, data of an actual participant observation in the geographical area of interest; and
   generating a new probability distribution of the activity based on a prior probability distribution and the actual participant observation.

7. A computer-implemented method for predicting a risk to a vulnerable activity in a geographical area of interest, comprising:
   receiving, at a computer programmed with appropriate software, INTEL data representative of intelligence information relating to at a threat activity in the geographical area of interest, the INTEL data including data of at least one of a meteorological and a climatological threshold associated with a threat participant in the threat activity;
   receiving, at the computer, METOC data representative of meteorological and climatological information associated with the geographical area of interest;
   receiving, at the computer, data representative of a vulnerable activity in the geographical area, the data including data of at least one of a meteorological and a climatological threshold associated with the vulnerable activity and further including data associated with a vulnerability of the vulnerable activity to the threat activity;
   generating, at the computer, data of a plurality of model threat participant trajectories for the threat activity, each trajectory having a specific associated set of INTEL and METOC attributes for the threat participant;
   compiling, at the computer, the data of the model participant trajectories for the threat participant;
   generating, at the computer, a probability distribution of the presence of the threat activity in the geographical area of interest for a future time period based on the compiled model threat participant trajectories;
   generating, at the computer, a probability distribution of a presence of meteorological conditions suitable for the vulnerable activity for the future time period;
   generating, at the computer, a probability distribution of the vulnerable activity in the geographical area of interest at the future time period, the probability distribution being based on the meteorological and climatological threshold associated with the vulnerable activity at the meteorological conditions at the future time period; and
   generating, at the computer, a probability distribution of the risk to the vulnerable activity from the threat activity based on the probability distribution of the vulnerable activity and the probability distribution of the threat activity.

8. The method according to claim 7, wherein the threat activity is pirate activity and the threat participant comprises a pirate group.

9. The method according to claim 7, wherein the vulnerable activity is a maritime activity in the geographical area of interest.

10. The method according to claim 9, wherein the maritime activity comprises shipping activity.

11. The method according to claim 7, wherein the meterological and climatological threshold associated with the threat participant includes at least one of a wave, wind, and current threshold and the METOC data includes at least one of wave data, wind data, and current data;
   wherein the probability distribution is based on at least one of a wave, wind, and current affecting the threat participant in the geographical area of interest.

12. The method according to claim 7, further comprising:
   receiving, at the computer, data of an actual observation of the threat activity in the geographical area of interest; and
   generating a new probability distribution of a risk of the threat activity based on a prior probability distribution of risk and the actual threat observation.

* * * * *